No. 728,597. PATENTED MAY 19. 1903.
J. McFARLAND.
AXLE BOX FOR VEHICLES.
APPLICATION FILED OCT. 22, 1902.
NO MODEL.
Fig: 1.
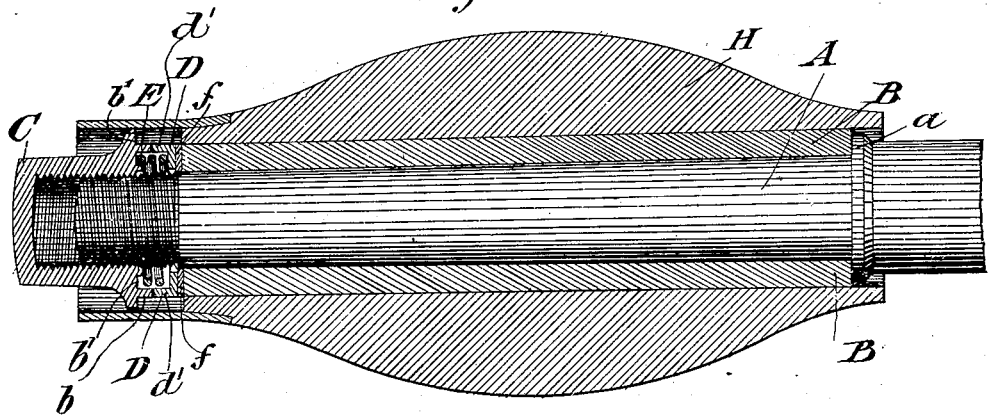
Fig: 2.
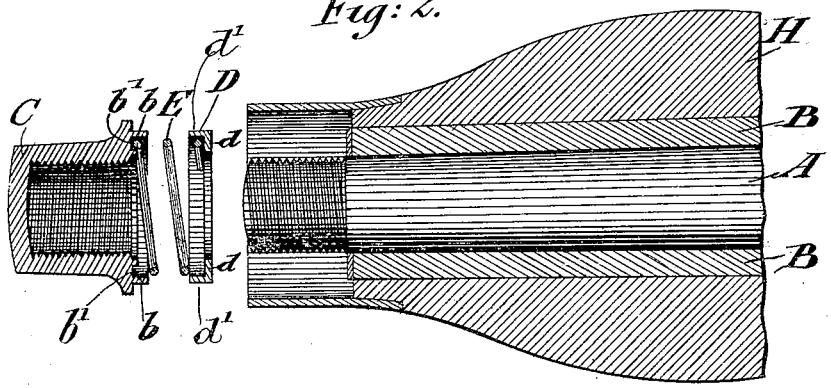
Fig: 3.
Fig: 4.
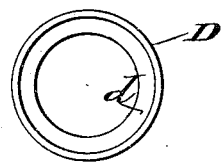
Witnesses
C. P. Goepel
Henry J. Schubier
Inventor
Julian McFarland
By his Attorneys
Fowler Niles
THE NORRIS PETERS CO., PHOTO-LITHO., WASHINGTON, D. C.

No. 728,597. Patented May 19, 1903.

UNITED STATES PATENT OFFICE.

JULIAN McFARLAND, OF BRENHAM, TEXAS.

AXLE-BOX FOR VEHICLES.

SPECIFICATION forming part of Letters Patent No. 728,597, dated May 19, 1903.

Application filed October 22, 1902. Serial No. 128,276. (No model.)

*To all whom it may concern:*

Be it known that I, JULIAN MCFARLAND, a citizen of the United States, residing in Brenham, in the county of Washington and State of Texas, have invented certain new and useful Improvements in Axle-Boxes for Vehicles, of which the following is a specification.

This invention relates to certain improvements in axle-boxes for vehicles in which after the axles and axle-boxes have been worn by use the lost motion can be taken up by interposing a tightening-washer and spring between the axle-box and nut, so that the axle-box of the wheel is restored to the same condition as when the same was new and by which the lost motion of the axle is taken up in an automatic, effective, and reliable manner; and for this purpose the invention consists in the combination, with the axle and axle-box, of a retaining screw-nut having a seat and an inwardly-projecting flange, an angular washer provided with a seat and with a laterally-projecting flange in line with the flange of the screw-nut, and a helical spring interposed between the seats of the nut and the washer, as will be fully described hereinafter and finally pointed out in the claims.

In the accompanying drawings, Figure 1 represents a vertical longitudinal section of an axle-box for vehicles with my improved spring-actuated washer placed in position thereon. Fig. 2 is a vertical longitudinal section of the same, showing the washer, spring, and nut separated from the axle and axle-box; and Figs. 3 and 4 show, respectively, a detail side view of the spring and a detail end view of the washer.

Similar letters of reference indicate corresponding parts.

Referring to the drawings, A represents the spindle at the end of a vehicle-axle, said spindle being screw-threaded at its end; B, the axle-box, which is seated in the hub H of the vehicle-wheel in the usual manner and placed on the spindle A, so as to abut against the shoulder $a$. The nut C is provided with an interior screw-thread and is screwed on the threaded end of the spindle in the well-known manner, the parts so far described being old and well known. Between the end of the axle-box and the nut is interposed an angular washer D and a helical spring E, which washer and spring are for the purpose of taking up any lost motion of the spindle or axle-box after the same have become worn by use. The angular washer D is made with an inwardly-projecting flange $d$, which serves as the seat for one end of the spring E, while an annular groove $b'$ inside of the inwardly-projecting flange $b$ of the nut serves as a seat for the other end of the spring E, as shown clearly in Fig. 2. The flange $b$ of the screw-nut C and the flange $d'$ of the angular washer D are in line with each other, so as to incase the spring to a greater or less extent. Between the washer D and the end of the axle-box is preferably interposed a leather washer $f$, by which a tight connection is formed between the washer D and the end of the axle-box.

My improved washer and spring are intended to be used with old or worn vehicle-axles, so as to restore the same to their original condition, by interposing the washer between the end of the axle-box and the flange $b'$ of the nut and placing the helical spring E on the threaded end of the spindle A. By then screwing home the nut on the threaded end of the spindle as far as permitted by the interposed washer D the lost motion in the parts is effectively taken up by the automatic action of the spring. As the spring is "incased," so to say, at one end by the washer and at the other end by the nut, there is no wear to the same, while the axle-box is restored to the proper working condition and all the slack or lost motion in the same automatically taken up.

My improved washer and spring are not intended to be used with new axle-boxes or to form a part of a specially-constructed axle-box; but they are intended solely for being used with the axle-boxes of the ordinary vehicle in use without any change in the axle, axle-box, or retaining-nut of the same. When the axle-box becomes gradually worn, so that there is too much play between the parts and liability of loosening the retaining-nut, then the washer and spring are interposed between the axle-box and retaining-nut, so that the same is restored to its original condition, and the liability of the loss of the retaining-nut and accidents from the wheel getting off the axle are prevented.

Having thus described my invention, I claim as new and desire to secure by Letters Patent—

1. The combination, with the spindle of an axle, said spindle being provided with a threaded end and a retaining-nut provided with an interior screw-thread for being screwed on the end of said spindle and provided with an inwardly-projecting flange having an annular groove, of an angular washer one leg of which is in line with the flange on the screw-nut, and a helical spring interposed between the flange of the nut and the other leg of the washer, said washer and spring being held on the spindle and end of the axle-box of the retaining-nut, substantially as set forth.

2. In an axle-box, the combination, with the retaining screw-nut having a seat and an inwardly-projecting flange, of an angular washer provided with a seat and with a laterally-projecting flange in line with the flange of the screw-nut, and a helical spring interposed between the seats of the nut and washer, substantially as set forth.

In testimony that I claim the foregoing as my invention I have signed my name in presence of two subscribing witnesses.

JULIAN McFARLAND.

Witnesses:
 WILL K. KRUG,
 J. H. CHAPPELL.